(12) United States Patent
Greene et al.

(10) Patent No.: US 11,351,676 B2
(45) Date of Patent: Jun. 7, 2022

(54) SELF-LIFTING ROBOT WITH AUTOMATIC RELEASE AND MULTI-JOINTED ARM

(71) Applicant: Cardinal Gibbons High School, Raleigh, NC (US)

(72) Inventors: Thomas Ryan Michael Greene, Raleigh, NC (US); Ilam Maya, Raleigh, NC (US); Christopher Randall Bain, Knightdale, NC (US); Gillian Nicole Kearney, Raleigh, NC (US); Brigitte Noelle Gallagher, Raleigh, NC (US); Cassian Farias Kraus, Apex, NC (US); William Andrew Mullee, Raleigh, NC (US); James Francis Gbruoski, Raleigh, NC (US); Oishi Ghosh, Apex, NC (US); Kristen Glielmi, Holly Springs, NC (US); Adam Hamad Malik, Raleigh, NC (US); Zachary Clayton Naylor, Raleigh, NC (US)

(73) Assignee: CARDINAL GIBBONS HIGH SCHOOL, Raleigh, NC (US)

( * ) Notice: Subject to any disclaimer, the term of this patent is extended or adjusted under 35 U.S.C. 154(b) by 286 days.

(21) Appl. No.: 16/573,662

(22) Filed: Sep. 17, 2019

(65) Prior Publication Data

US 2021/0078183 A1  Mar. 18, 2021

(51) Int. Cl.
*B25J 15/00* (2006.01)
*B25J 5/00* (2006.01)
*B25J 9/16* (2006.01)
*B25J 15/02* (2006.01)
*B25J 9/06* (2006.01)

(52) U.S. Cl.
CPC ........ *B25J 15/0028* (2013.01); *B25J 5/005* (2013.01); *B25J 9/06* (2013.01); *B25J 9/1697* (2013.01); *B25J 15/0033* (2013.01); *B25J 15/0206* (2013.01)

(58) Field of Classification Search
CPC  B25J 15/0028; B25J 15/0033; B25J 15/0206; B25J 5/005; B25J 9/1697; B25J 9/06
See application file for complete search history.

(56) References Cited

U.S. PATENT DOCUMENTS

| | | | |
|---|---|---|---|
| 4,091,943 A * | 5/1978 | Bay-Schmith ......... | A01D 90/08 414/555 |
| 7,618,230 B2 * | 11/2009 | Sallen Rosello .. | B62D 49/0678 414/680 |
| 8,794,386 B2 | 8/2014 | Keeling et al. | |

(Continued)

*Primary Examiner* — Stephen A Vu
(74) *Attorney, Agent, or Firm* — Haynes and Boone, LLP

(57) ABSTRACT

Disclosed is a self-lifting robot with multi-jointed arm. The robot includes a multipart housing, a traction drivetrain capable of generating translational and rotational motion of the self-lifting robot on a working surface, and a deployment hook configured to release from a storage hanger, thus depositing the self-lifting robot onto the working surface, and configured to re-attach to the storage hanger, thus lifting the self-lifting robot off of the working surface. The robot also includes a multi jointed arm, and a grabber disposed from a free-rotating wrist joint at a distal end of the multi-jointed arm, and configured to grab, hold, and release one or more target objects.

10 Claims, 16 Drawing Sheets

(56) References Cited

U.S. PATENT DOCUMENTS

| | | | |
|---|---|---|---|
| 9,211,922 B2 | 12/2015 | Keeling et al. | |
| 9,422,137 B2* | 8/2016 | Kearney | B66C 1/66 |
| 9,864,369 B2 | 1/2018 | Gravel et al. | |
| 10,384,338 B2 | 8/2019 | Greene et al. | |
| 2009/0294218 A1* | 12/2009 | Archer | B66F 9/065 |
| | | | 187/237 |
| 2010/0068024 A1* | 3/2010 | Agens | B25J 15/04 |
| | | | 414/729 |
| 2013/0006444 A1* | 1/2013 | Keeling | B66F 9/08 |
| | | | 701/2 |
| 2015/0273687 A1* | 10/2015 | Greene | B25J 18/025 |
| | | | 414/729 |
| 2018/0154933 A1 | 6/2018 | Bain et al. | |

* cited by examiner

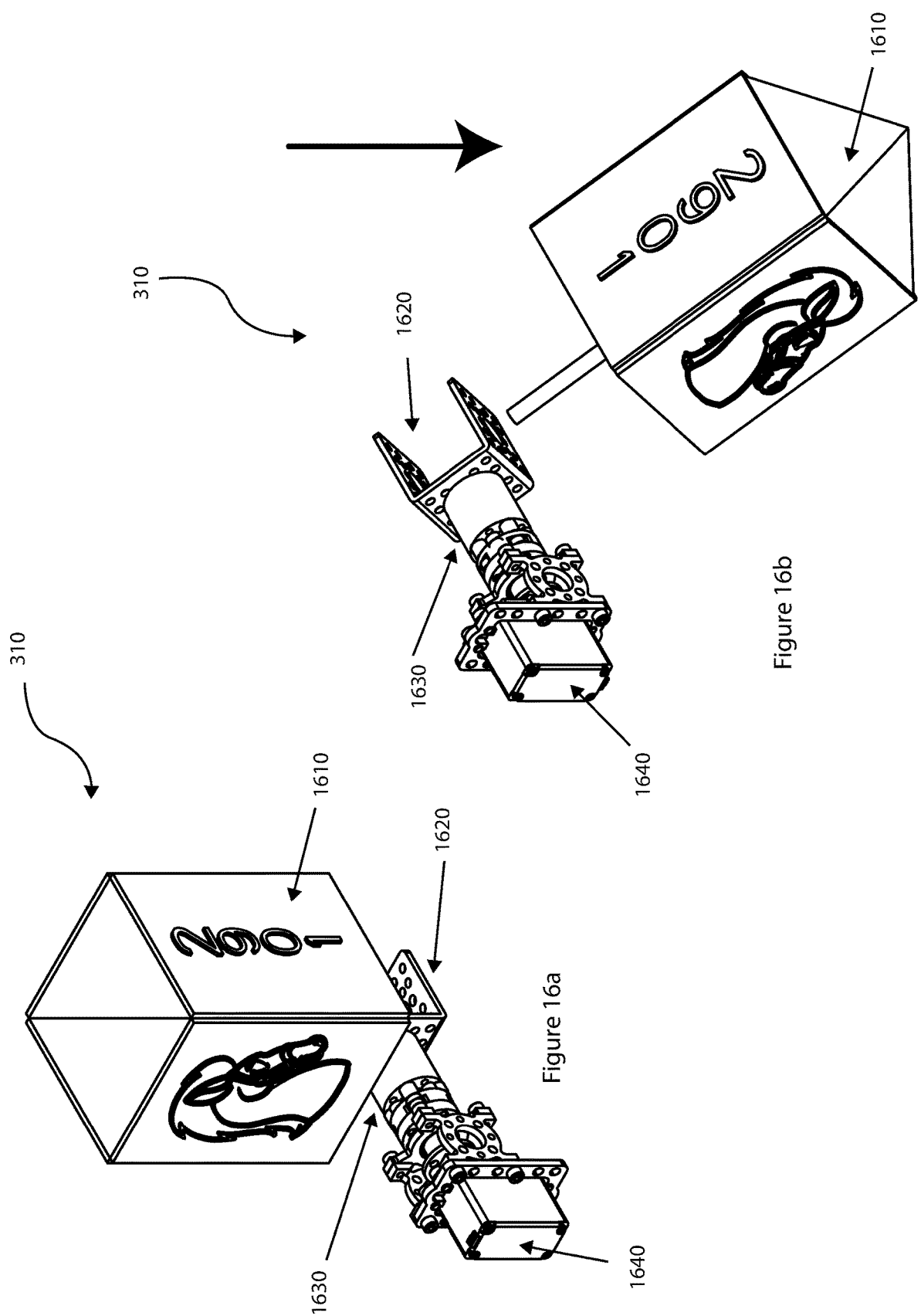

SELF-LIFTING ROBOT WITH AUTOMATIC RELEASE AND MULTI-JOINTED ARM

TECHNICAL FIELD

The subject matter described herein relates to a self-lifting robot for retrieving, carrying, and depositing small objects. This robot has particular but not exclusive utility for manufacturing, mining, undersea exploration and space exploration.

BACKGROUND

Object-gripping and object-carrying robots are known, and used in manufacturing and space exploration. However, manufacturing robots are not typically designed to self-deploy from a small, folded package, and in many cases are attached to a fixed base and therefore lack translational mobility altogether. Exploratory robots such as planetary rovers may fit into compact packages for launch, transit, and landing operations, and may be capable of rolling translational motion over surfaces, but typically lack multi jointed arms and dexterous grippers that enable complex tasks. Neither type of robot is intended to self-deploy from a carrier, or to return itself to the carrier when its tasks are complete.

It is to be appreciated that such commonly used robots have numerous drawbacks, including large package sizes, low mobility, low dexterity, and otherwise. Accordingly, long-felt needs exist for robots that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is a self-lifting robot with automatic release and multi jointed arm. The self-lifting robot with automatic release and multi jointed arm disclosed herein has particular, but not exclusive, utility for manufacturing, mining, undersea exploration and space exploration. The robot includes a multipart housing; a traction drivetrain capable of generating translational and rotational motion of the self-lifting robot on a working surface; a deployment hook configured to release from a storage hanger, thus depositing the self-lifting robot onto the working surface, and configured to re-attach to the storage hanger, thus lifting the self-lifting robot off of the working surface; a multi jointed arm; and a grabber disposed from a free-rotating wrist joint at a distal end of the multi jointed arm, and configured to grab, hold, and release one or more target objects. Other embodiments of this aspect include corresponding computer systems, apparatus, and computer programs recorded on one or more computer storage devices, each configured to perform the actions of the methods.

Implementations may include one or more of the following features. The self-lifting robot where the deployment hook is disposed at a distal end of an extendable mast operated by a linear actuator, and where the deployment hook is operated the linear actuator combined with a return spring and a static track that define a particular orientation of the deployment hook for each particular position of the linear actuator. The self-lifting robot where the linear actuator includes a limit switch. The self-lifting robot where the multi-jointed arm includes: a shoulder joint attached to the self-lifting robot and operated by a shoulder joint motor and a shoulder gear; an upper arm attached to and oriented by the shoulder joint; an elbow joint attached to the upper arm and operated by an elbow joint motor, an elbow joint motor shaft, an elbow joint worm gear, and an elbow joint gear; and a forearm attached to and operated by the elbow joint, where the free-rotating wrist joint is disposed at a distal end of the forearm. The self-lifting robot where the grabber includes: two pedipalps, each pedipalp including a hub and four paddles; a grabber motor; a gear train that causes the pedipalps to rotate synchronously in opposite directions in response to a rotation of the grabber motor; a holding area configured to hold one or more target objects, such that when the pedipalps rotate in an inward direction, target objects are drawn into the holding area, and such that when the pedipalps rotate in an outward direction, target objects are expelled from the holding area; and a hinge limiter or hinge block adjacent to the free-rotating wrist joint, to prevent the grabber from pivoting around the free-rotating wrist joint below a certain angle relative to the forearm. The self-lifting robot further including a processor, where the processor is a smartphone and where the smartphone is protected within a phone case attached to the multipart housing. The self-lifting robot where the processor keeps track of the self-lifting robot's orientation by integrating an inertial measurement unit gyroscope, and where the processor keeps track of the self-lifting robot's position by integrating traction drivetrain rotation encoders. The self-lifting robot further including a color-sensitive 3d vision system configured to enable the processor to identify a location and a color for each of the one or more target objects. The self-lifting robot further including a marker drop mechanism configured to drop a marker upon receipt of a signal from the processor, and where the multipart housing includes side plates. The self-lifting robot where the marker includes a dreidel shape and a logo. The self-lifting robot further including internal supports to keep the self-lifting robot from bending while the deployment hook is lifting the self-lifting robot off of the working surface, and where the traction drivetrain includes two tank treads, and where each tank tread includes an upward-angled front section. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the self-lifting robot with automatic release and multi jointed arm, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 16a is a perspective view of the marker drop actuator, in accordance with at least one embodiment of the present disclosure.

FIG. 16b is a perspective view of the marker drop actuator in a rotated state, with the marker falling out of the marker holder under the influence of gravity.

DETAILED DESCRIPTION

Figure 1:
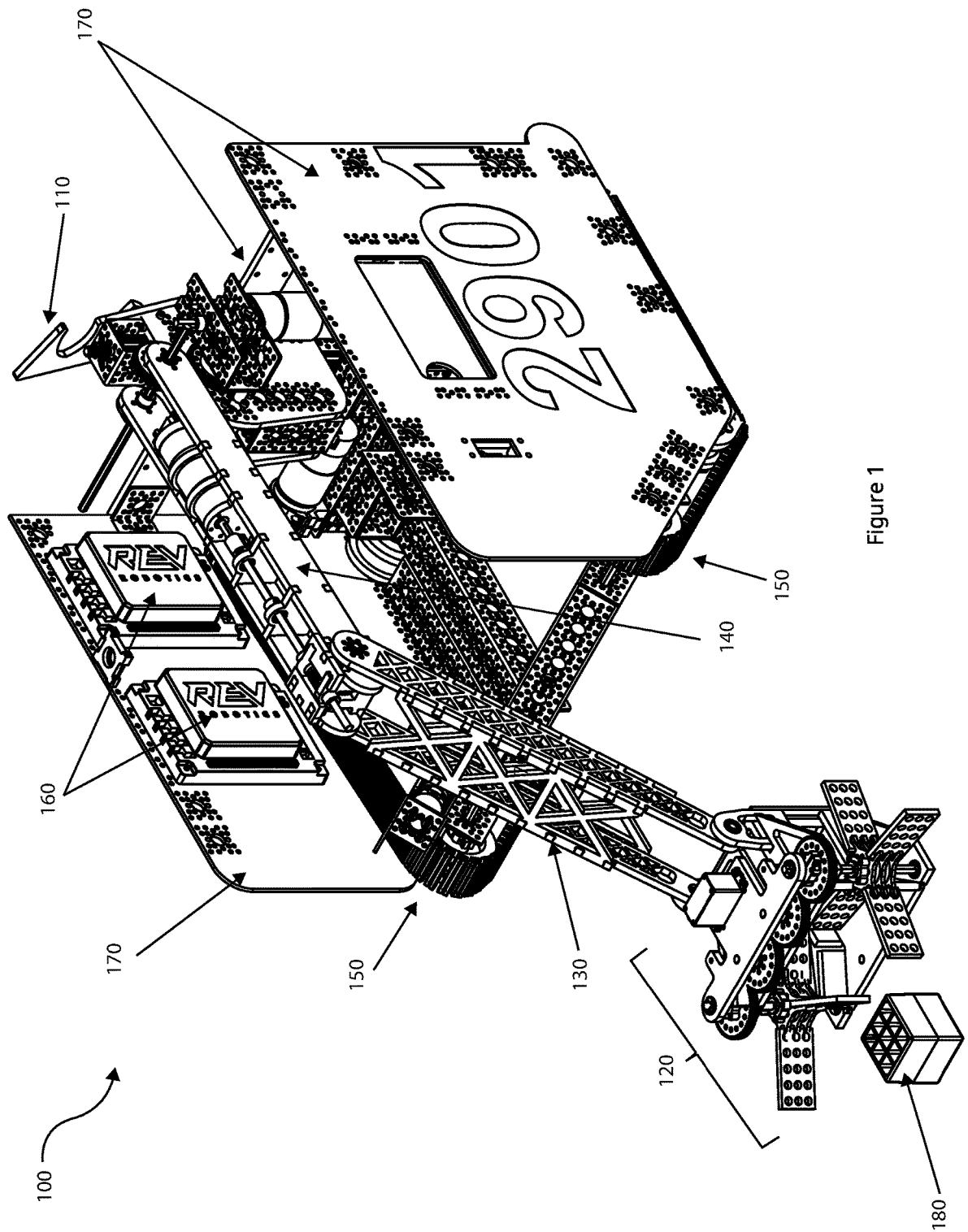
FIG. 1 is a perspective view of a self-lifting robot with automatic release and multi jointed arm in accordance with at least one embodiment of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

In accordance with at least one embodiment of the present disclosure, a self-lifting robot with automatic release and multi jointed arm is provided which is configured to deploy from a small package, lower to a work surface, unfold into a working configuration, lift and transport objects, deliver and drop the objects in a receptacle, fold back into a transport configuration, and raise itself back onto a carrier.

These descriptions are provided for exemplary purposes only, and should not be considered to limit the scope of the self-lifting robot with automatic release and multi-jointed arm. Certain features may be added, removed, or modified without departing from the spirit of the claimed subject matter.

FIG. 1 is a perspective view of a self-lifting robot 100 with automatic release and multi-jointed arm in accordance with at least one embodiment of the present disclosure. The robot 100 includes a deployment hook 110, grabber 120, forearm 130, upper arm 140, mobility treads 150, electronic controllers 160, and a multipart housing 170. In an example, the grabber 120 is configured to pick up a target object 180.

In an example, the robot uses a smartphone as a processor. Navigation software models a working surface as a 12×12 coordinate plane, treating the robot as the center point on the field. Using the Pythagorean theorem, the distance between two points is determined, with the form the square root of the difference of the x points squared and the difference in the y points squared. This allows the processor to know the diagonal distance between two points. With encoders on the robot, the processor keeps track of distance traveled between the two points. Orientation is derived by integrating an inertial measurement unit (IMU) gyroscope.

In an example, the IMU gyroscope has a scale from −180 to 180 degrees, and to ensure that the robot turns a precisely desired amount, the robot's speed is reduced as it approaches the correct angle, with the speed being directly proportional to the distance left to the goal.

In an example, the robot includes a 3D color vision system (e.g., as part of the smartphone or processor). The vision system identifies target objects by color by looking at the saturation of the pixels to determining which of the target objects has the least amount of white. In an example, the vision system reads through every 10 pixels to get the hue values of the pixels and puts the hue values into an array file on the processor. In an example, the vision system converts RGB color data to HSV color data to determine the saturation and the value of the objects.

In an example, the multipart housing (e.g., side plates) and drivetrain are reminiscent those of a tank, including upward-pointing treads in the front. The purpose of these is to be able to drive over steep craters and other barriers on the working surface. The robot also includes mechanical supports to limit structural bending while the robot is lifting itself. This is important so that the robot does not collapse while lifting its own weight.

Before continuing, it should be noted that the examples described above are provided for purposes of illustration, and are not intended to be limiting. Other devices and/or device configurations may be utilized to carry out the operations described herein.

Figure 2:
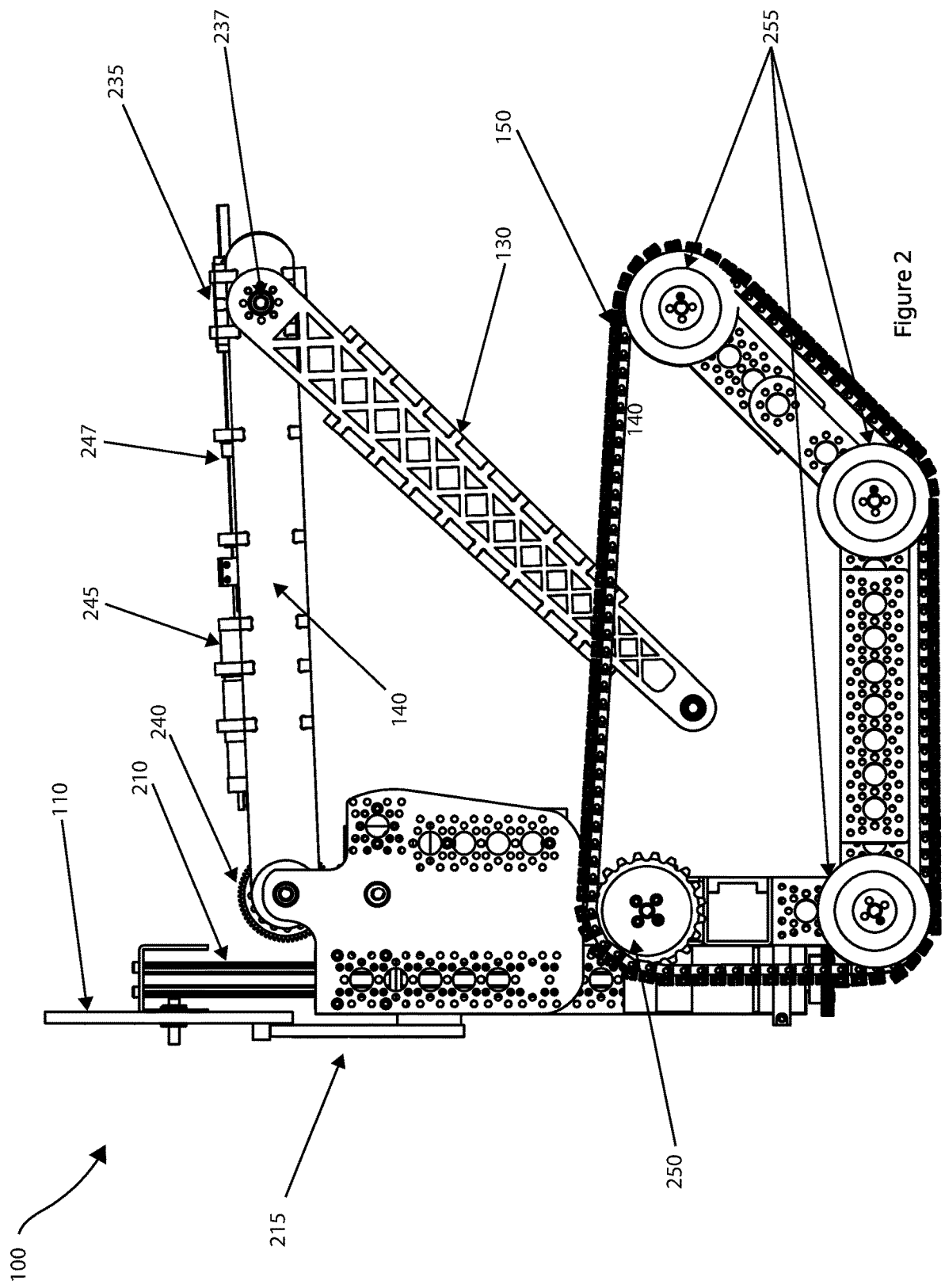
FIG. 2 is a side view of a self-lifting robot with automatic release and multi-jointed arm in accordance with at least one embodiment of the present disclosure.

FIG. 2 is a side view of a self-lifting robot 100 with automatic release and multi jointed arm in accordance with at least one embodiment of the present disclosure. Visible are the deployment hook 110, forearm 130, upper arm 140, and mobility treads 150. For visual clarity, the grabber 120 is not shown in this view. Also visible are an extendable mast 210, hook actuator 215, shoulder joint 240, elbow motor 245, elbow motor shaft 247, elbow worm gear 235, elbow joint 237, tread drive wheel 250, and tread idler wheels 255.

Figure 3:
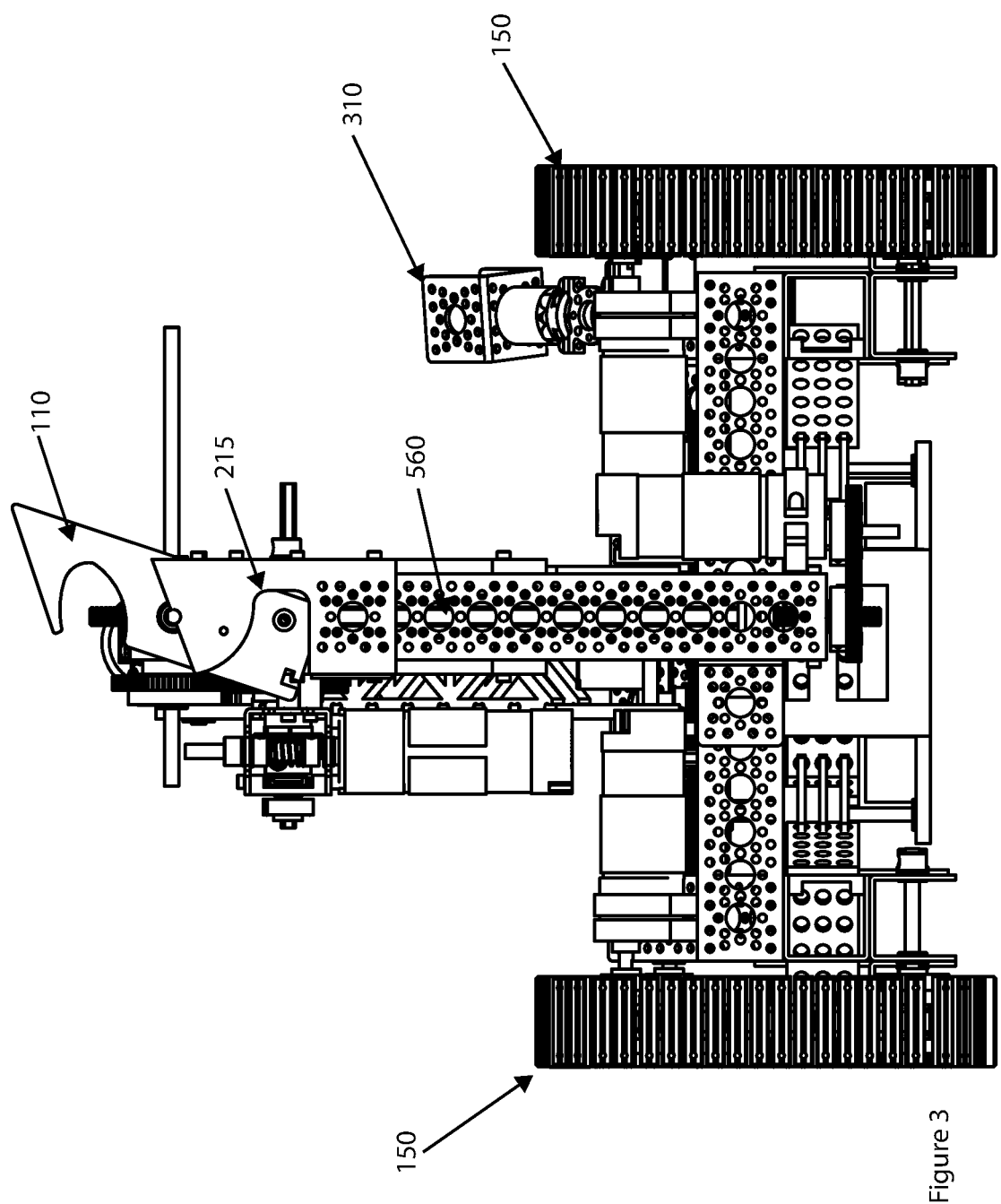
FIG. 3 is a rear view of a self-lifting robot with automatic release and multi-jointed arm in accordance with at least one embodiment of the present disclosure.

FIG. 3 is a rear view of a self-lifting robot 100 with automatic release and multi jointed arm in accordance with at least one embodiment of the present disclosure. For visual clarity, the multipart housing 170 is absent from this view. Visible are the treads 150, deployment hook 110, deployment hook actuator 215, and tower 560. Also visible is a marker drop actuator 310.

Figure 4:
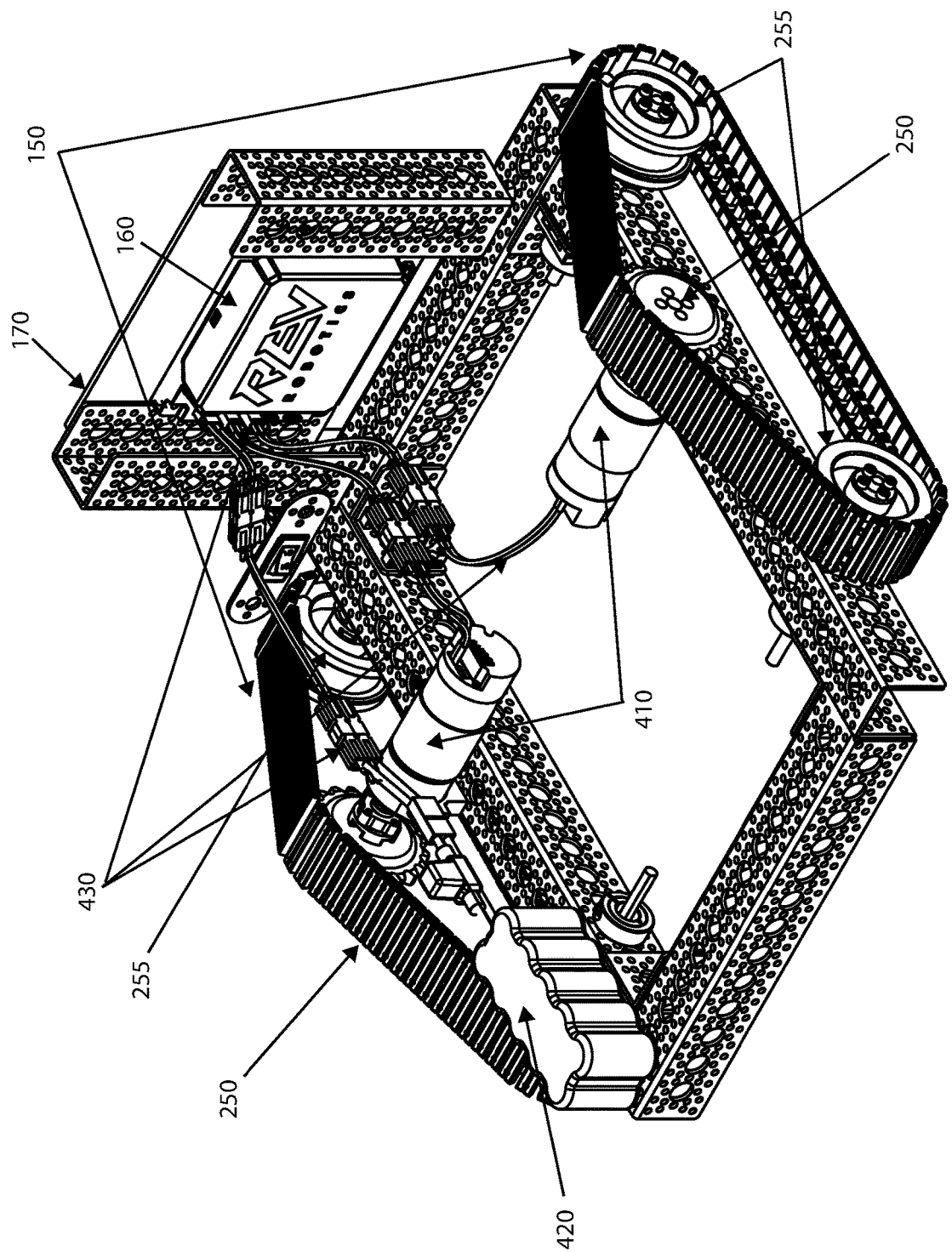
FIG. 4 is a perspective view of components of an exemplary self-lifting robot with automatic release and multi-jointed arm in accordance with at least one embodiment of the present disclosure.

FIG. 4 is a perspective view of components of an exemplary self-lifting robot 100 with automatic release and multi jointed arm in accordance with at least one embodiment of the present disclosure. Visible are the mobility treads 150, a controller 160, a portion of the housing 170, the tread drive wheels 250 and idler wheels 255. FIG. 4 shows these components in a slightly different but functionally equivalent embodiment to that shown in FIGS. 1-3. Also visible are two drive wheel motors 410 that power the tread drive wheels 250, a battery pack 420 that supplies electrical power, and wiring 430 that connects the battery pack 420 to the controller 160 and the controller 160 to the drive wheel motors 250. When electrical signals from the controller 160 activate a switch, power is connected from the battery pack 420 to the motors 410 such that the two motors 410 rotate the two drive wheels 250 at a fixed speed in any combination of forward or reverse directions, and the drive wheels 250 drive the treads 150 to propel the robot. For example, if the left drive wheel 250 and right drive wheel 250 both rotate in a forward direction, the robot 100 moves in a forward direction, whereas if both drive wheels 250 rotate in a reverse direction, the robot 100 moves in a reverse direction, and if the left drive wheel rotates forward and the right drive wheel rotates in reverse, the robot 100 turns to the right, and if the left drive wheel rotates in reverse and the right drive wheel rotates forward, the robot 100 turns to the left.

Figure 5:
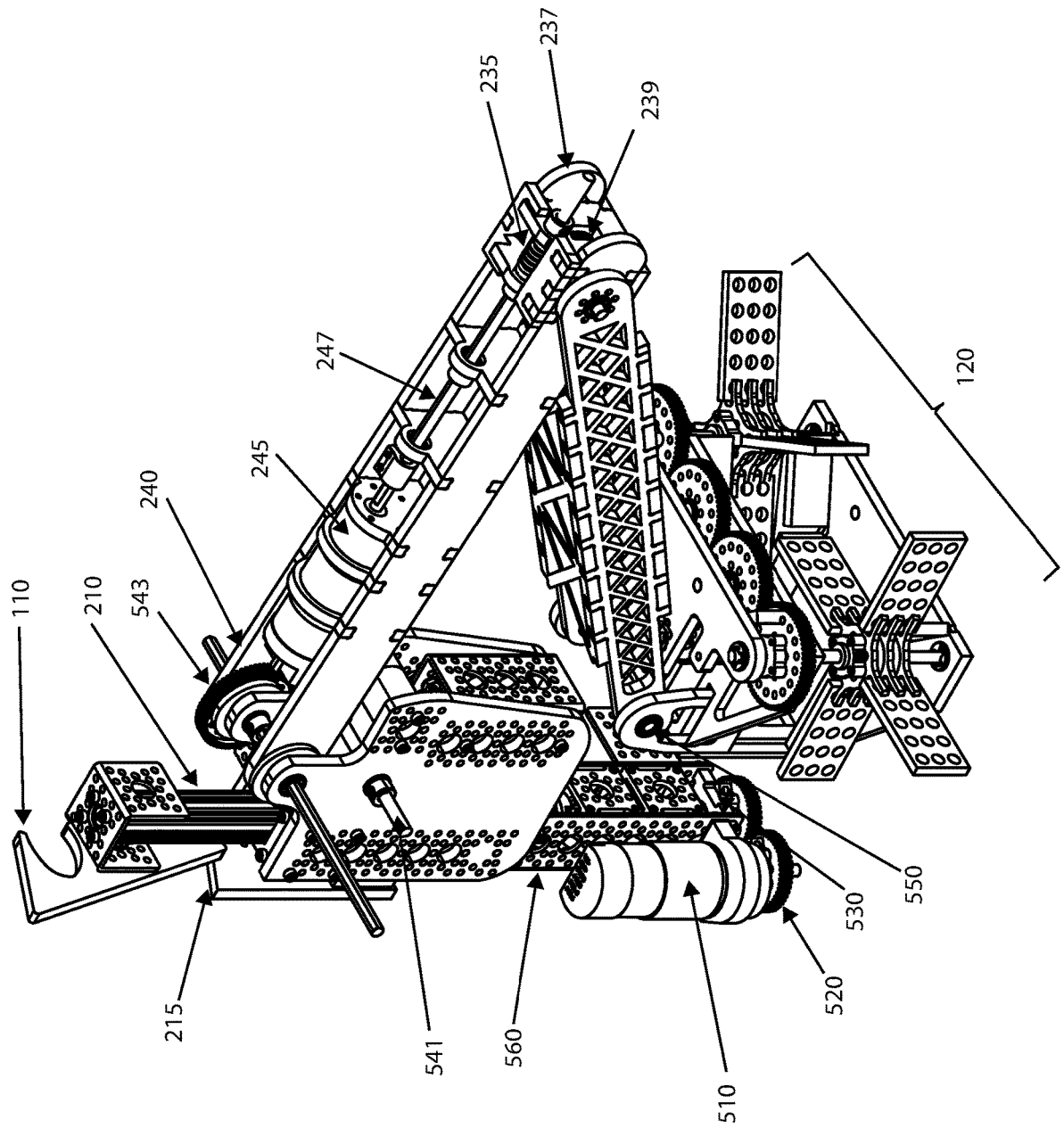
FIG. 5 is a perspective view of components of an exemplary self-lifting robot 100 with automatic release and multi jointed arm in accordance with at least one embodiment of the present disclosure.

FIG. 5 is a perspective view of components of an exemplary self-lifting robot 100 with automatic release and multi jointed arm in accordance with at least one embodiment of the present disclosure. Visible are the deployment hook 110, grabber 120, extendable mast 210, and hook actuator 215. Also visible is a mast motor 510, which rotates a set of gears 520 that rotate a worm gear 530 that raises and lowers the extendable mast 210 within a tower 560. In an example, the mast motor 510 receives power via wires 430 from the battery pack 420 under the control of a controller or processor 160, and can be driven in either a forward direction to raise the mast 210 or a reverse direction to lower the mast 210. This arrangement advantageously provides for secure actuation with little or no slippage.

Also visible is a shoulder motor 541 that drives a shoulder gear 543 to rotate the shoulder joint 240. In an example, the shoulder motor 541 receives power via wires 430 from the battery pack 420 under the control of a controller 160, and can be driven in either a forward direction to raise the upper arm 140 or a reverse direction to lower the upper arm 140 by rotating the shoulder joint. This arrangement advantageously provides for secure actuation with little or no slippage.

Additionally visible is the elbow motor 245, which rotates the elbow motor shaft 247, which rotates the elbow worm gear 235, which in turn rotates an elbow gear 239 that causes the elbow joint 237 to rotate, thus raising or lowering the forearm 130. In an example, the elbow motor 245 receives power via wires 430 from the battery pack 420 under the control of a controller 160, and can be driven in either a forward direction to raise the forearm 130 or a reverse direction to lower the forearm 130 by rotating the shoulder joint. This arrangement advantageously provides for secure actuation with little or no slippage.

The robot 100 also includes a wrist joint 550 that is configured to rotate such that the grabber 120 remains in a horizontal orientation as shown, regardless of the angles of the shoulder joint 240 and elbow joint 239, and regardless of the orientations of the upper arm 140 and forearm 130. In an example, the mechanism for raising the mast 210 includes a single linear actuator with a limit switch. This switch prevents the mast's linear actuator from damaging any important gears or electronics by stopping them whenever they get close to contacting the motor or damaging the hook itself.

Figure 6:
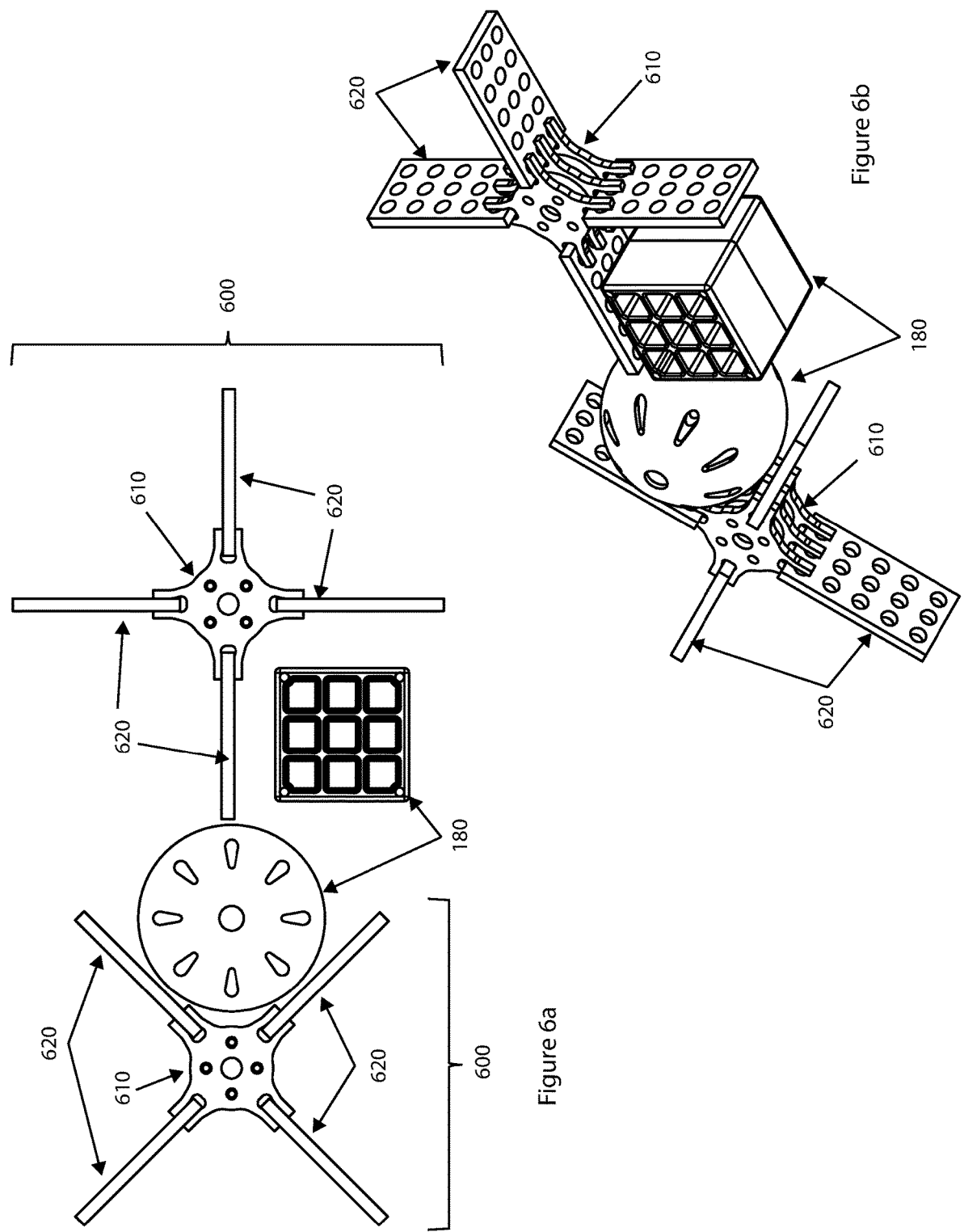
FIG. 6a and FIG. 6b show perspective views of two pedipalps, each of which consists of a hub and four paddles, in accordance with at least one embodiment of the present disclosure.

FIG. 6a and FIG. 6b show perspective views of two pedipalps 600, each of which consists of a hub 610 and four paddles 620, in accordance with at least one embodiment of the present disclosure. In an example the paddles 620 are sized, shaped, and spaced such that when the hubs 610 counterrotate in an inward direction, target objects 180 on a surface in front of the grabber 120 can be engaged by the paddles 610 and drawn into the grabber 120, and when the hubs 610 counterrotate in an outward direction, target objects 180 located inside the grabber 120 are expelled from the grabber 120, and when the hubs 610 are prevented from rotating (e.g., by a stiff motor that is turned off), target objects 180 are retained inside the grabber 120. In an example, the grabber can thus be employed to pick target objects (e.g., samples of mineral ore) up off a surface (e.g., a floor or ground surface) and place them into a bin. In an example, the paddles 620 are made from rubber gasket material, and the hubs 610 are made of Lexan.

Figure 7:
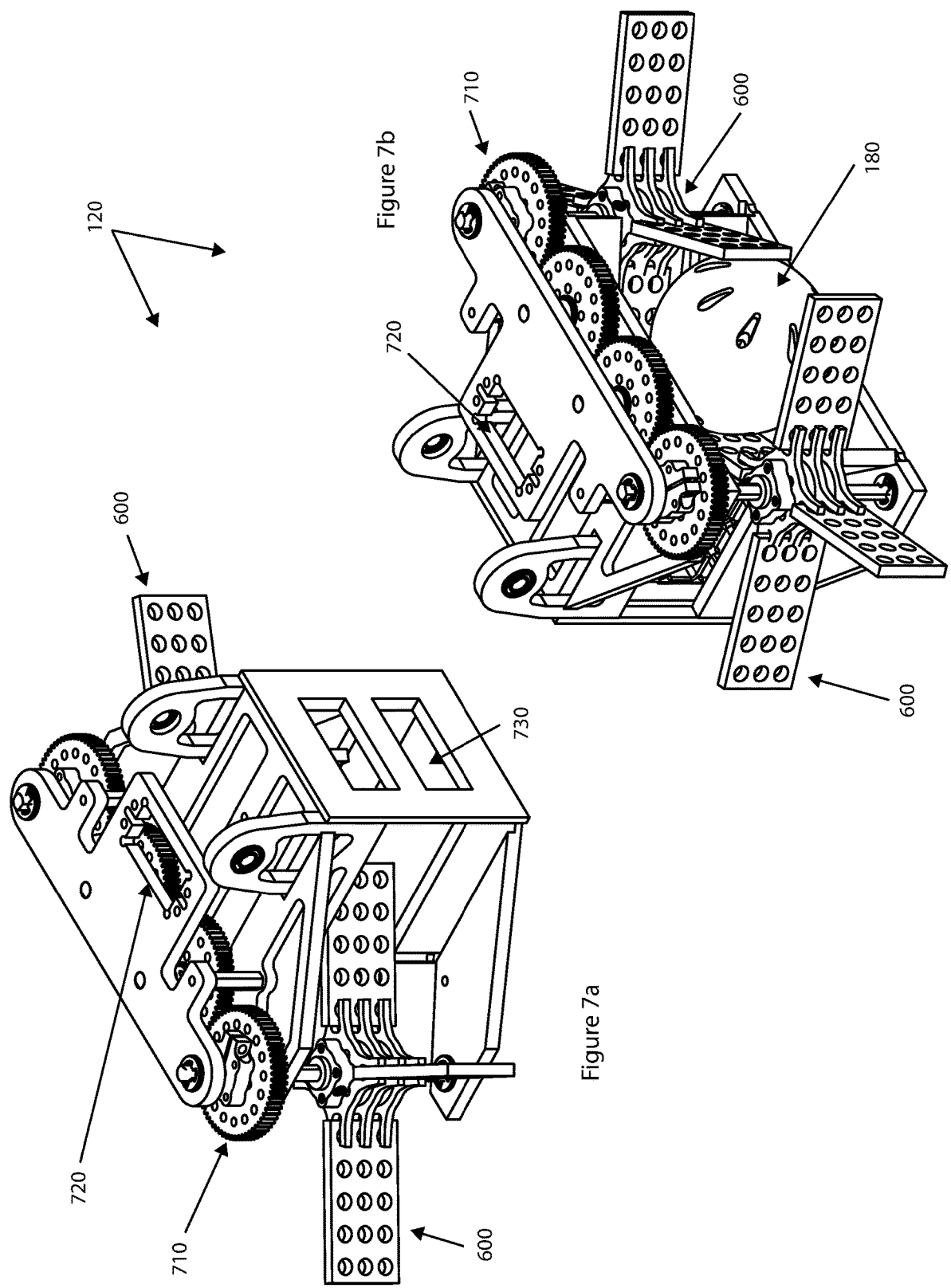
FIG. 7a and FIG. 7b show perspective views of the grabber, in accordance with at least one embodiment of the present disclosure.

FIG. 7a and FIG. 7b show perspective views of the grabber 120, in accordance with at least one embodiment of the present disclosure. The grabber 120 has two pedipalps 600 with which to engage target objects 180. The pedipalps are driven by a gear train 710 configured such that when a motor operating through a slot 720 engages the gear train 710, the gear train drives the pedipalps to counterrotate or rotate in opposite directions—either inward (for picking up target objects) or outward (for expelling or dropping target objects). The grabber 120 includes a holding area 730 located behind the pedipalps 600. In an example, the holding area is sized and shaped such that when the pedipalps 600 are not rotating, or are rotating in an inward direction, a target object 180 of a given size that is stored in the holding area 730 will be retained in the holding area, and when the pedipalps 600 are rotating in an outward direction, a target object 180 of a given size is expelled from the holding area and dropped by the grabber 120. FIG. 7b shows a target object 180 in the midst of being picked up or dropped by the grabber 120.

In an example, the grabber 120 is constructed from a lightweight Lexan frame and is powered by a single continuous-rotation servo. The servo drives a 1.5" gear, which is connected to a train of four 2" gears. On opposite ends of the train, the gears spin two pedipalps 600. The pedipalps spin synchronously in opposite directions to pull in and push out materials.

Figure 8:
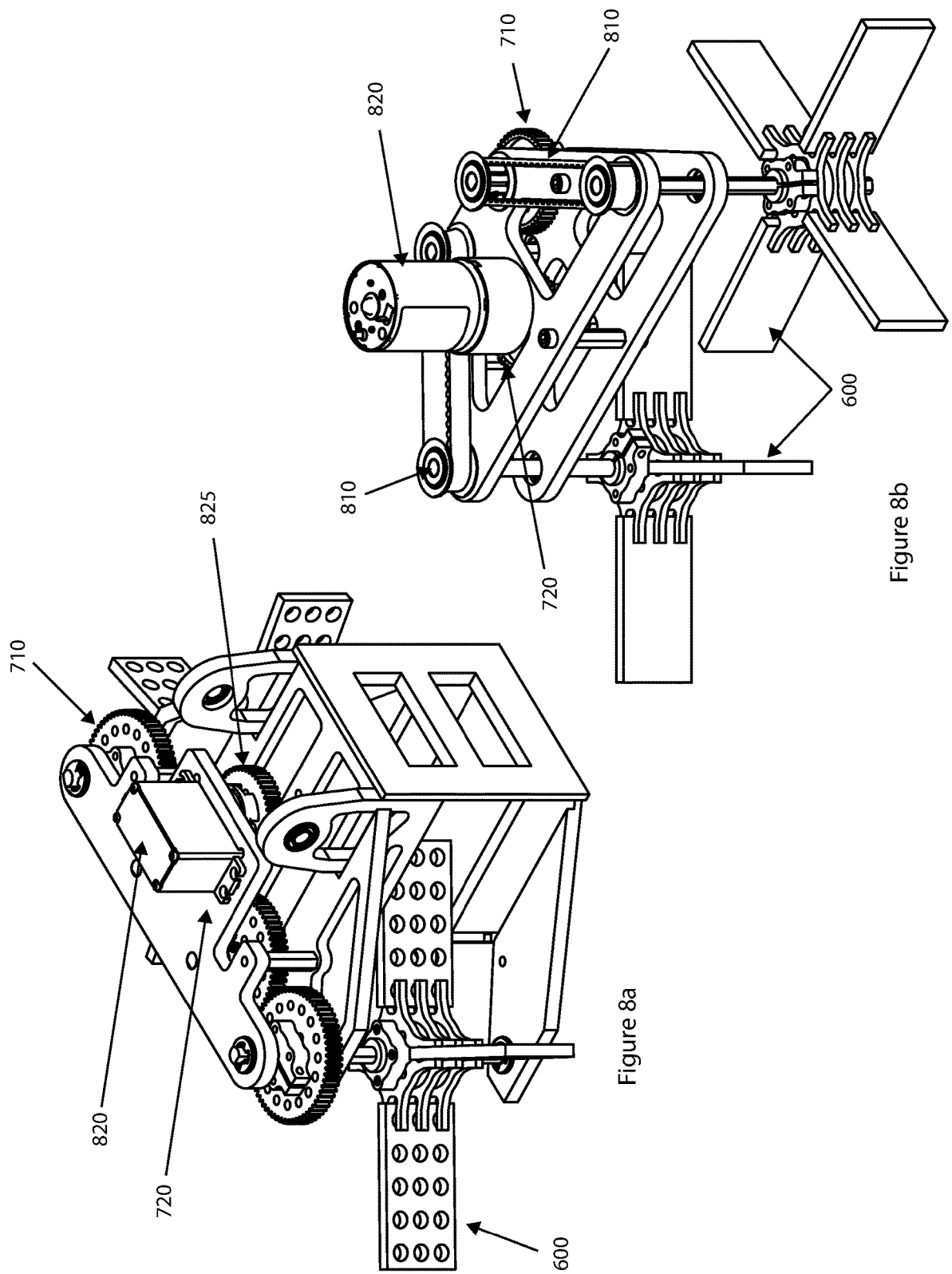
FIG. 8a and FIG. 8b are perspective views of a portion of the grabber, in accordance with at least one embodiment of the present disclosure.

FIG. 8a and FIG. 8b are perspective views of a portion of the grabber 120, in accordance with at least one embodiment of the present disclosure. In FIG. 8a, slot 720 has been filled with a grabber servomotor 820 that rotates a gear 825 that in turn rotates the gear train 710 that causes the pedipalps 600 to rotate synchronously in opposite directions. In an example, the grabber servomotor 810 receives power via wires 430 from the battery pack 420 under the control of a controller 160, and can be driven in either a forward direction to pick up target objects 180 by counterrotating the pedipalps 600 in an inward direction, or a reverse direction to drop target objects 180 by counterrotating rotating the pedipalps 600 in an outward direction. This arrangement advantageously provides for secure actuation of the pedipalps with little or no slippage. In an example, the holding area 730 of the grabber 120 is constructed with vertical walls arranged in such a way as to prevent target objects 180 from stacking side-by-side.

In the alternative embodiment of FIG. 8b, part of the gear train 710 has been replaced with a pair of belt drives 810 that serve the same function, and the slot 720 is larger and shaped differently than the slot 720 shown in FIGS. 7a and 7b. A grabber motor 810 takes the place of the grabber servomotor 820, and projects downward through the slot 720 to rotate the gear train 710 and belt drives 810 and thus operate the pedipalps 600 as stated above.

In the example shown in FIG. 8b, the paddles 620 of the pedipalps 600 are shown as solid, whereas in FIGS. 6b, 7a, 7b, and 8a they are shown with a pattern of holes. These holes are optional, and can be introduced into the paddles to lighten them, to reduce air resistance, or to reduce a breeze generated by the pedipalps as they rotate.

Figure 9:
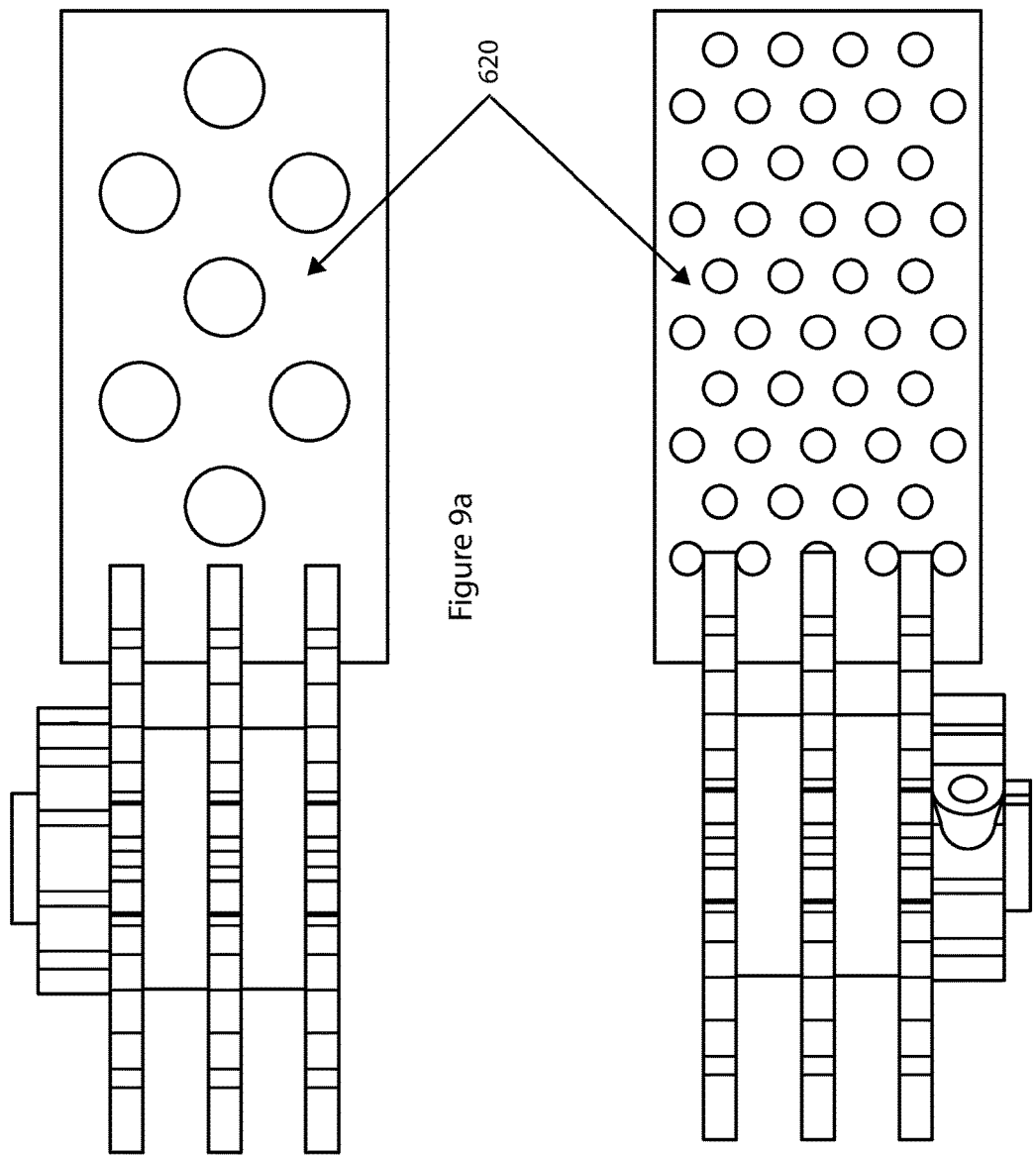
FIG. 9a and FIG. 9b show two different optional hole patterns for the paddles of the pedipalps, in accordance with at least one embodiment of the present disclosure.

FIG. 9a and FIG. 9b show two different optional hole patterns for the paddles 620 of the pedipalps 610, in accordance with at least one embodiment of the present disclosure. Hole patterns and other textures may be selected to reduce weight or stiffness of the paddles 620, to reduce air resistance or breeze generation, to improve gripping ability, for aesthetic reasons, or otherwise.

Figure 10:
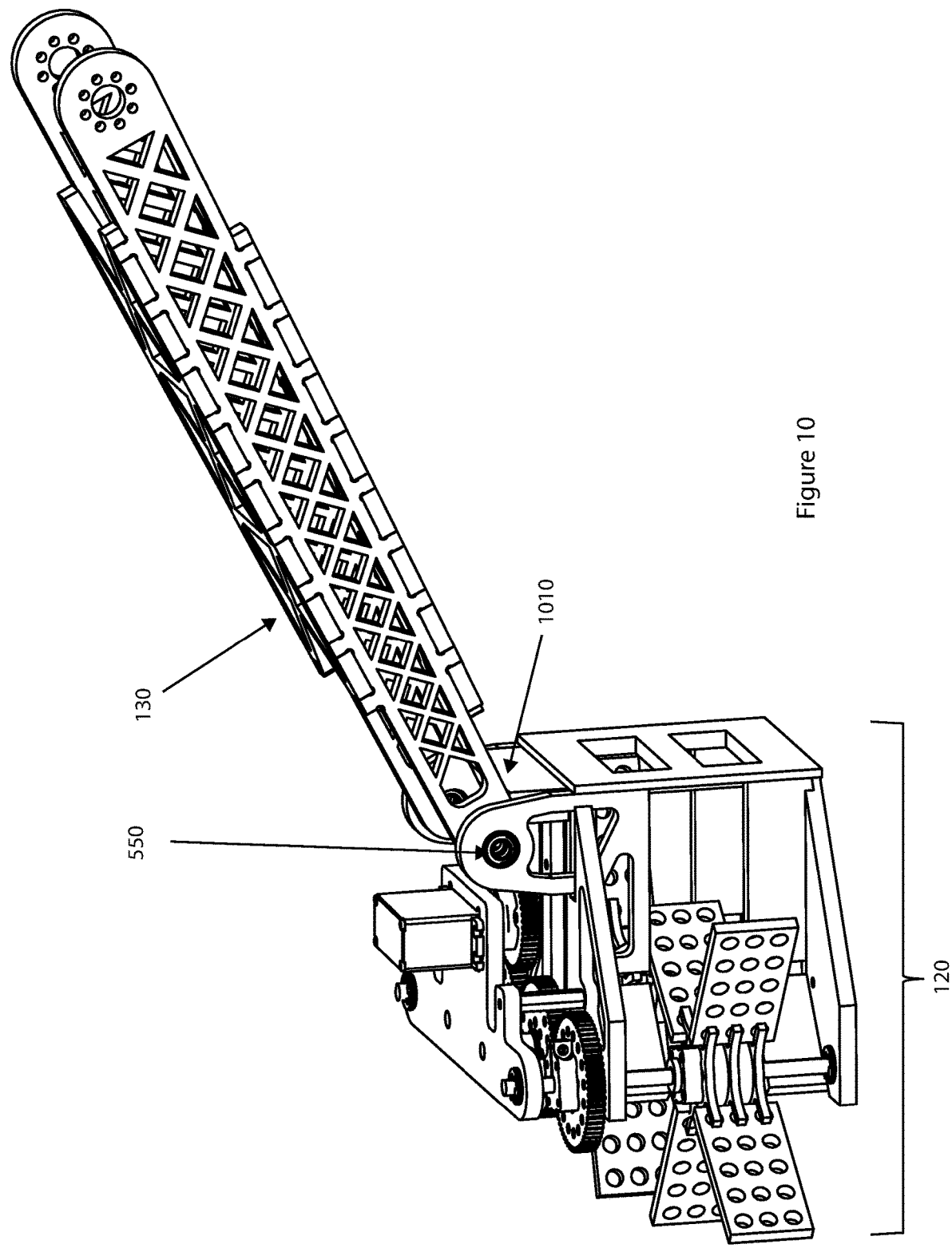
FIG. 10 is a side view of the grabber, showing the wrist joint and forearm, in accordance with at least one embodiment of the present disclosure.

FIG. 10 is a side view of the grabber 120, showing the wrist joint 550 and forearm 130, in accordance with at least one embodiment of the present disclosure. In an example, the wrist joint 550 is unpowered and rotates freely, and the wrist joint 550 also includes a small block 1010 that serves as a hinge limiter or hinge block, to prevent the grabber 120 from pivoting around the free-rotating wrist joint 550 below a certain angle relative to the forearm. This ensures that the pedipalps 600 stay approximately horizontal relative to the working surface, rather than falling down at an angle.

Figure 11:
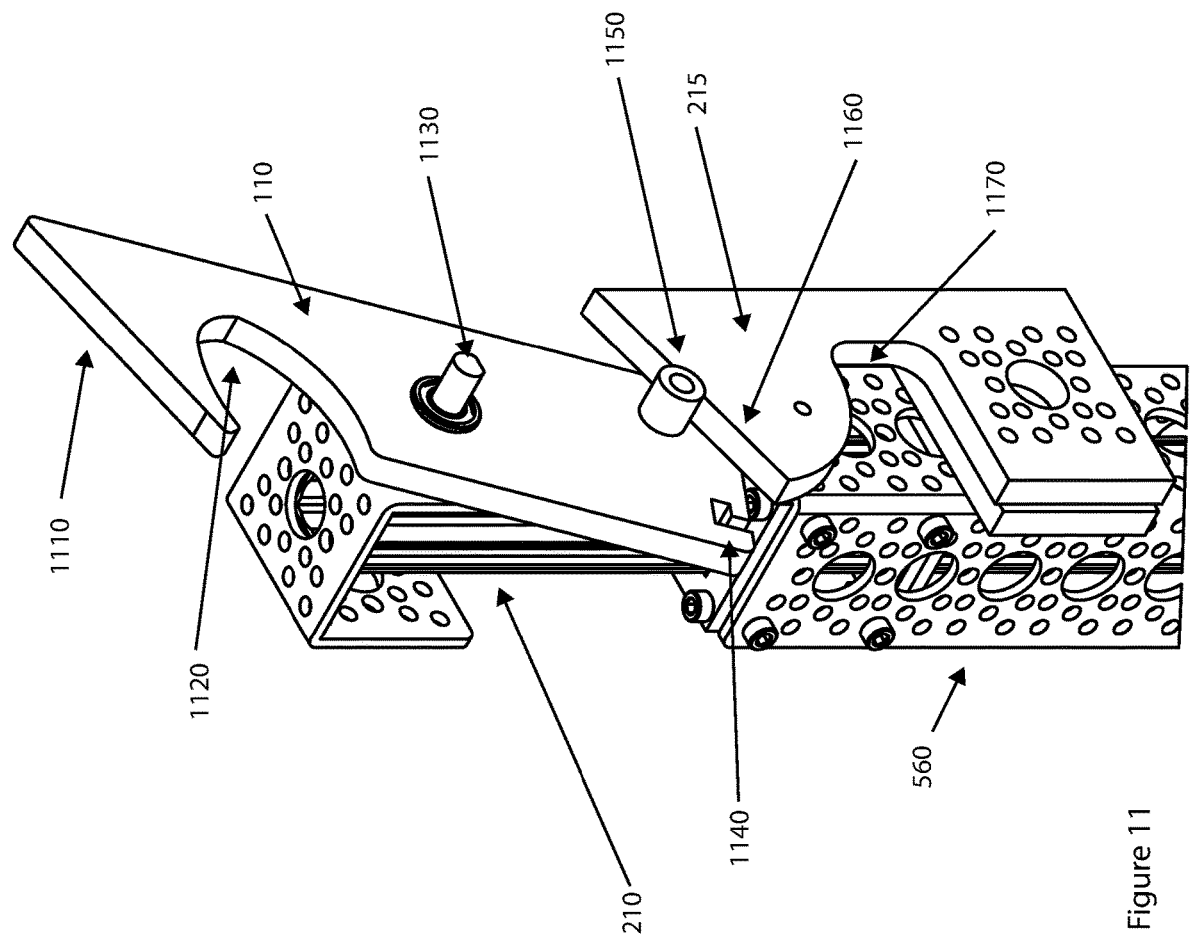
FIG. 11 is a perspective view of the deployment hook and the mechanisms that operate it, in accordance with at least one embodiment of the present disclosure.

FIG. 11 is a perspective view of the deployment hook 110 and the mechanisms that operate it, in accordance with at least one embodiment of the present disclosure. The deployment hook 110 includes a slide portion 1110 and an engagement portion 1120, and rotates around an axle 1130 affixed to the extendable mast 210. In some embodiments, the axle is spring-loaded such that when rotated away from vertical, the deployment hook 110 experiences a torque that tends to return it to a vertical orientation. In other embodiments, this spring force or return force is provided by an elastic member (e.g., a rubber band) hooked to an elastic notch 1140 that serves the same function. The deployment hook 110 also includes a slider post 1150 that slides along a slide portion 1160 of the deployment hook actuator 215 and engages with an engagement portion 1170 of the deployment hook actuator 215.

In an example, the deployment hook actuator 215 is rigidly affixed to the tower 560, such that when the extendable mast 210 is fully retracted into the tower 560, the slider post 1150 of the deployment hook 110 falls within the engagement portion 1170 of the deployment hook actuator 215, which permits the engagement hook to return to a fully vertical orientation. As the extendable mast 210 is extended out of the tower 560, the slider post 1150 moves along the contours of the engagement portion 1170 to reach the lowest point of the slider portion 1160 of the deployment hook actuator 215, which rotates the deployment hook into a fully open or retracted position, wherein the engagement portion 1120 is facing substantially upward. As the mast 210 continued to extend, moves higher along the slider portion 1160 of the deployment hook actuator, permitting the deployment hook 110 to rotate back toward the vertical. The contours of the deployment hook actuator form a static track which, combined with the spring torque on the deployment hook axle 1130, defines a particular orientation of the deployment hook for each position of the extendable mast. When the mast 210 is in its fully extended position, the slider post 1150 disengages from the slider portion 1160 of the deployment hook actuator 215, thus permitting the deployment hook 110 to return to a fully vertical orientation, wherein the engagement portion 1120 of the deployment hook 110 creates a recessed overhang that is capable of hooking to a horizontal member as shown below.

Figure 12:
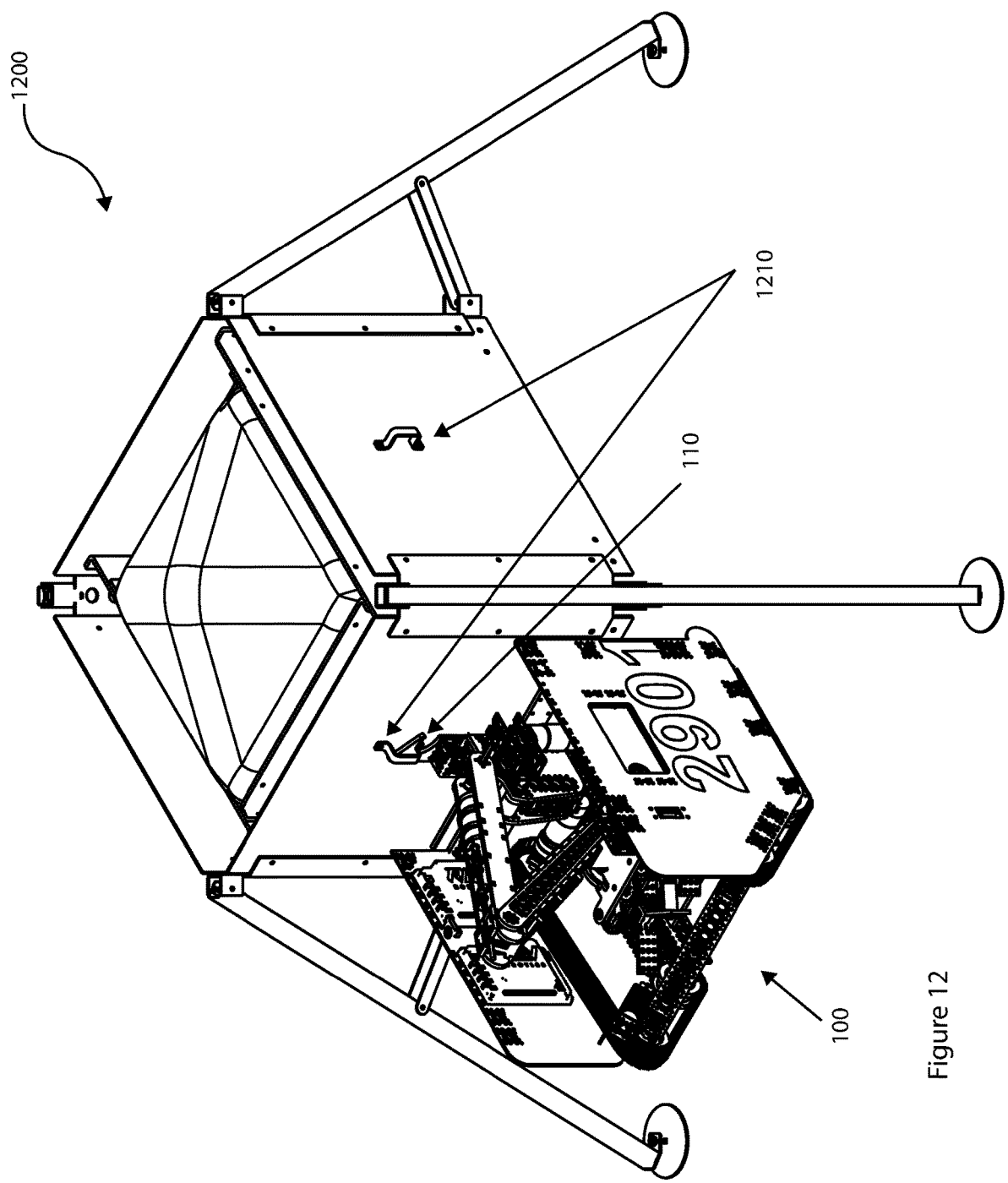
FIG. 12 is a perspective view of the robot attached to a lander in accordance with at least one embodiment of the present disclosure.

FIG. 12 is a perspective view of the robot 100 attached to a lander 1200 in accordance with at least one embodiment of the present disclosure. In this example, the robot 100 is in a folded state, with the forearm 130 and upper arm 140 oriented such that the grabber 120 rests within the housing 170. The lander (e.g., an astronautical probe) includes handles or storage hangers 1210, and the deployment hook 110 of the robot 100 is hooked securely to one of the handles 1210 with the mast 210 fully retracted into the tower 560.

Figure 13C:
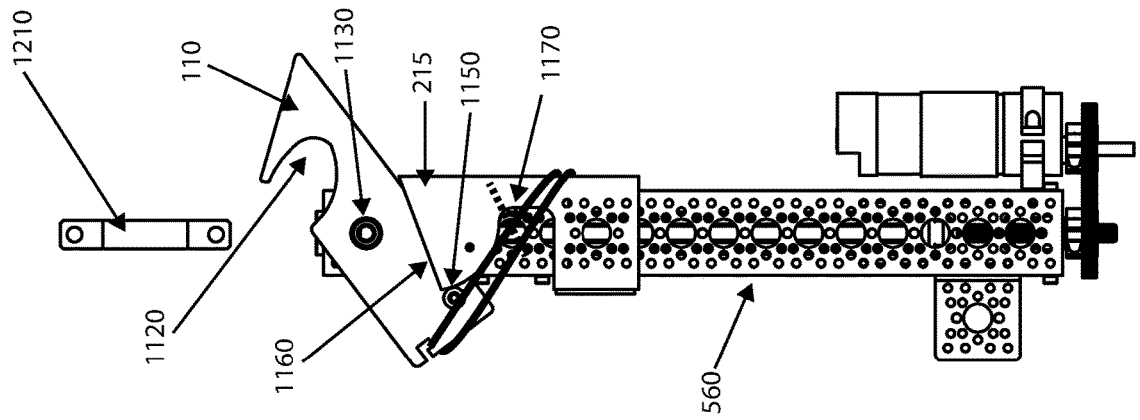
FIG. 13a, FIG. 13b and FIG. 13c are rear views of the process by which the deployment hook of the robot detaches from the handle of the lander.
Figure 13B:
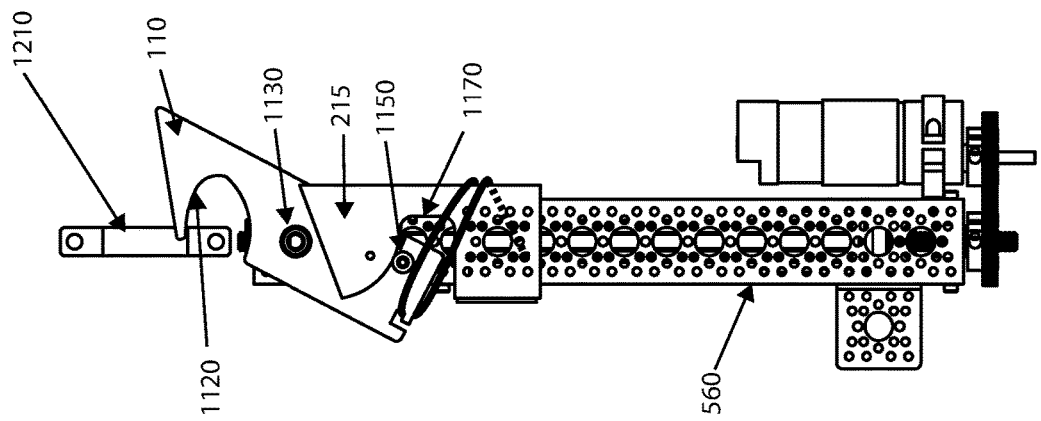
Figure 13A:
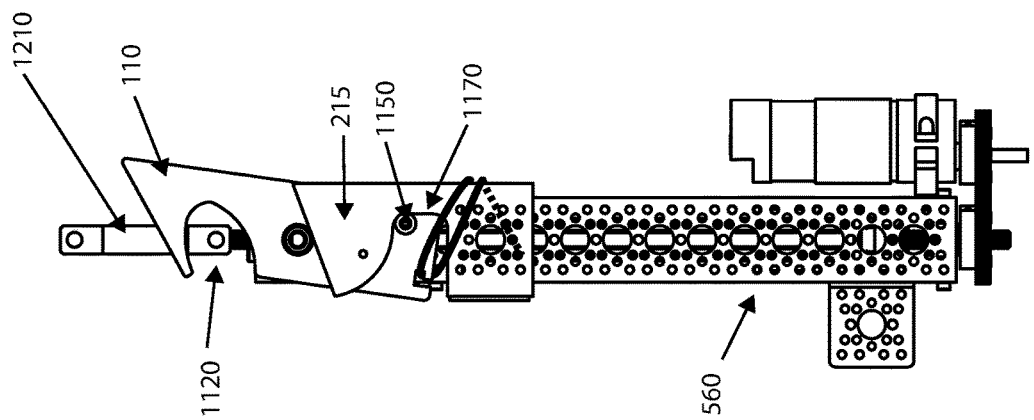

FIG. 13a, FIG. 13b and FIG. 13c are rear views of the process by which the deployment hook 110 of the robot 100 detaches from the handle 1210 of the lander 1200. In FIG. 13a, the mast 210 is extended from the tower 560 until the treads 150 of the robot 100 make contact with a surface (e.g., a floor or ground surface). The engagement portion 1120 of the deployment hook 110 is fully engaged with a horizontal surface of the handle 1210, and the slider post 1150 of the deployment hook 110 is fully engaged with the engagement portion 1170 of the deployment hook actuator 215, which prevents the deployment hook 110 from rotating, thus permitting the robot 100 to hang from the handle 1210.

In FIG. 13b, the mast 210 is extended a short distance (e.g., a few millimeters) further from the top of the tower 560. Together with the spring torque around the deployment hook axis 1130, this extension of the mast 210 causes the slider post 1150 to follow the contours of the engagement portion 1170 of the deployment hook actuator 215. This in turn causes the deployment hook 110 to rotate around the deployment hook axle 1130, which moves the engagement portion 1120 of the deployment hook 110 partially off of the handle 1210.

In FIG. 13c, the mast 210 is extended further (e.g., a few centimeters) from the top of the tower 560. This causes the slider post 1150 to follow the contour of the engagement portion 1170 of the deployment hook actuator 215, to the lowest part of the slider portion 1160 of the deployment hook actuator 215. This in turn causes the deployment hook 110 to rotate further around the deployment hook axle 1130, which rotates the engagement portion 1120 of the deployment hook 110 fully away from the handle 1210, thus releasing the robot 100 from the lander 1200.

In an example, the deployment hook 110 and deployment hook actuator 215 are made of Lexan, and operate in a manner similar to a gate latch. For example, when the gate closes, the latch is pushed out of the way by the rod on the gate. The latch locks in place in the hook section of the latch with the help of gravity.

Figure 14:
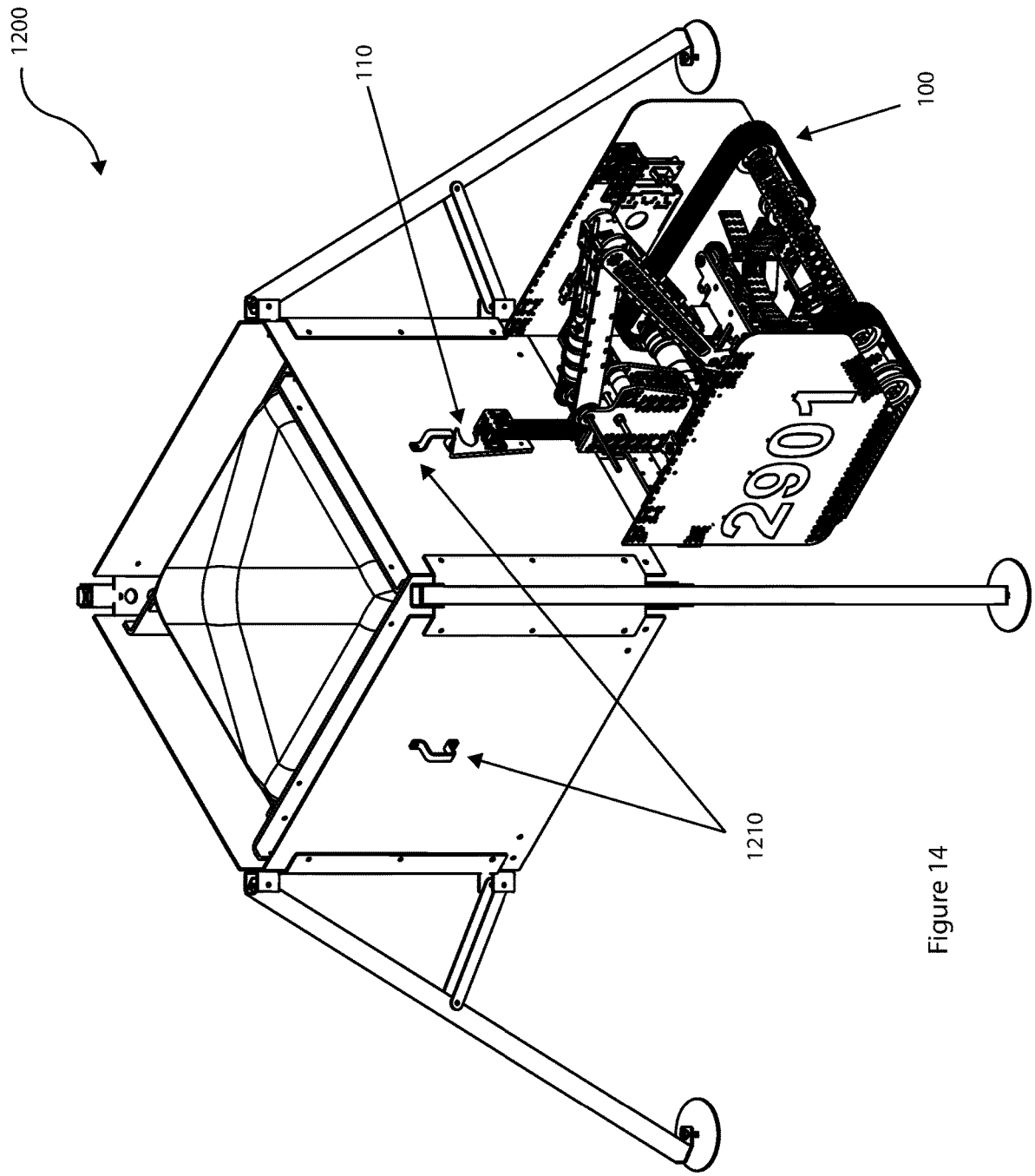
FIG. 14 is a perspective view of an example self-lifting robot with automatic release and multi-jointed arm preparing to reattach itself to the lander.

FIG. 14 is a perspective view of an example self-lifting robot 100 with automatic release and multi-jointed arm preparing to reattach itself to the lander 1200. The robot 100 has backed up against the lander 1200 such that the deployment hook 110 is directly beneath one of the handles 1210 of the lander 1200, and the mast 210 has been extended from the tower 560 until the deployment hook 110 is in contact with a bottom surface of the handle 1210.

Figure 15C:
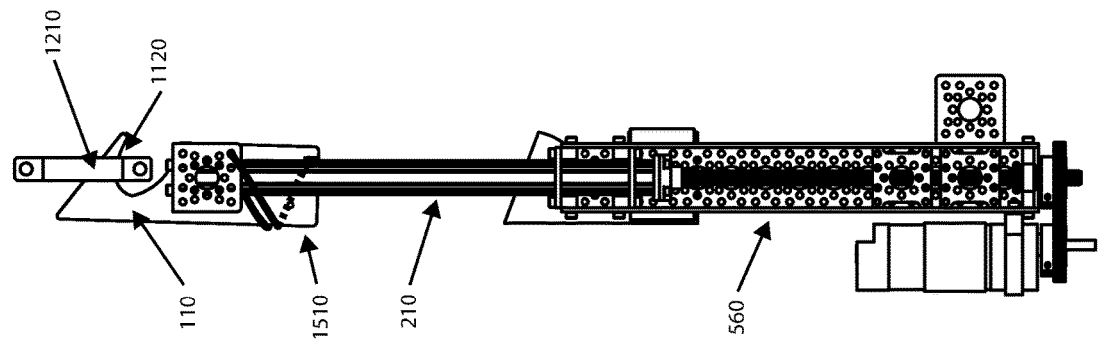
FIG. 15a, FIG. 15b, and FIG. 15c are front views of the process by which the robot reattaches itself to the lander.
Figure 15B:
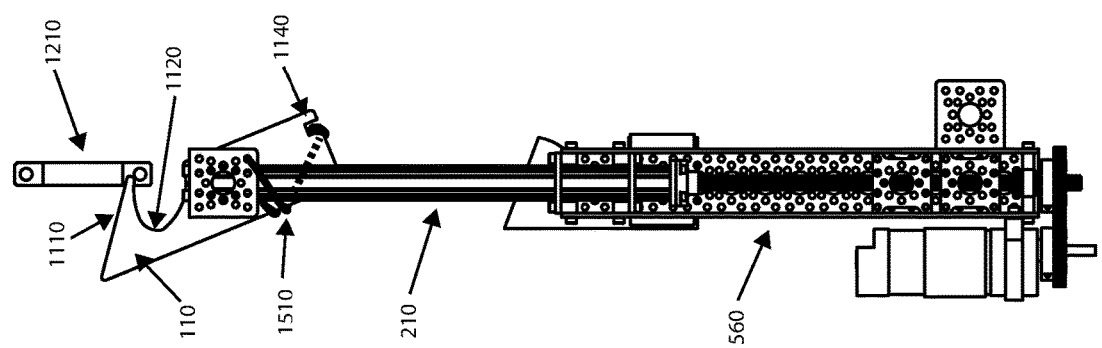
Figure 15A:
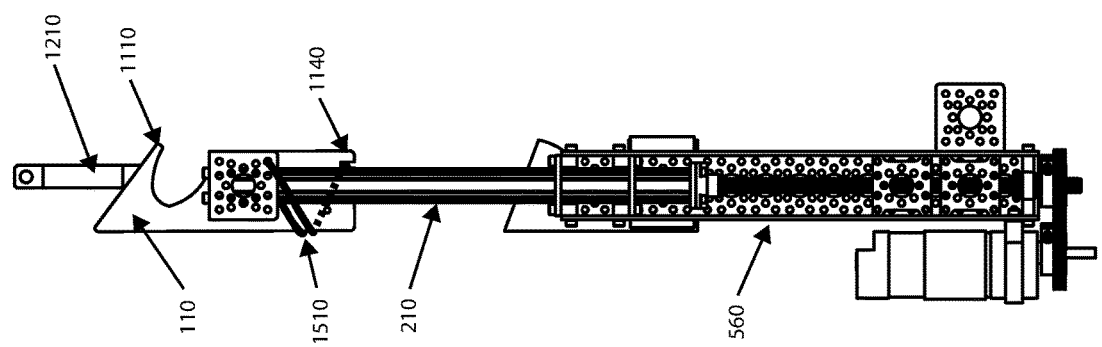

FIG. 15*a*, FIG. 15*b*, and FIG. 15*c* are front views of the process by which the robot 100 reattaches itself to the lander 1200 (e.g., to recharge, or after operations are complete). In FIG. 15*a*, the mast 210 has been extended from the tower 560 until the slider portion 1110 of the deployment hook 110 is in contact with a bottom surface of the handle 1210.

In FIG. 15*b*, the mast 210 is extended further, such that the slider portion 1110 of the deployment hook 110 slides against the handle 1210, which in combination with the spring torque on the deployment hook axle 1130, causes the deployment hook 110 to rotate around the deployment hook axle 1130 until the engagement portion 1120 of the deployment hook 110 engages with the handle 1210.

In FIG. 15*c*, the mast 210 is extended still further, until the spring torque on the deployment hook axle 1310 causes the deployment hook 110 to return to a fully vertical position. This has the effect of bringing the engagement portion 1120 of the deployment hook 110 into full engagement with a horizontal portion of the handle 1210. At this point, retracting the mast 210 into the tower 560 will lift the robot 100 off of the ground. And return it to a configuration similar to that seen in FIG. 12.

Also visible in FIGS. 15*a* 15*b* and 15*c* is a rubber band or tensioner 1510 hooked into the elastic notch 1140 that provides a returning torque on the deployment hook axle 1130 that tends to return the deployment hook 110 to an upright position in the absence of other forces.

FIG. 16*a* is a perspective view of the marker drop actuator 310, in accordance with at least one embodiment of the present disclosure. The marker drop actuator includes a marker 1610 held by a marker holder 1620 attached to an axle 1630 rotated by a servomotor 1640. In an example, the servomotor 1640 receives power from a battery 420 via wires 430 under the control of a controller 160. Depending on the implementation, the controller 160 may be autonomous, semi-autonomous, or teleoperated. When the servomotor 1640 is activated, the marker holder 1620 rotates about the axle 1630 until the marker 1610 drops out of the marker holder 1620 under the influence of gravity.

FIG. 16*b* is a perspective view of the marker drop actuator 310 in a rotated state, with the marker 1610 falling out of the marker holder 1620 under the influence of gravity.

Based on design considerations and depending on the implementation, the robot can be made from a variety of different materials and structural elements, and can comprise a variety of different structural arrangements that perform the same functions. As will be readily appreciated by those having ordinary skill in the art after becoming familiar with the teachings herein, the robot can be autonomous, semi-autonomous, or teleoperated. Accordingly, it can be seen that the self-lifting robot 100 with automatic release and multi-jointed arm fills a long-standing need in the art, by providing a robot that is capable of deploying from a storage configuration on a suspension handle (e.g., in a storage area or on a carrier vehicle), unfolding into a working configuration, moving around on a work surface (e.g., a floor or ground surface), retrieving target objects from the work surface, moving the target objects to a storage bin, depositing the target objects in the storage bin, re-folding itself into the storage configuration, and then returning to the suspension handle, reattaching itself, and lifting itself back into the storage position.

The robot of the present disclosure may include one or more processors or controllers comprising any combination of general-purpose computing devices, reduced instruction set computing (RISC) devices, application-specific integrated circuits (ASICs), field programmable gate arrays (FPGAs), or other related logic devices, including mechanical and quantum computers. In some embodiments, the processor comprises a memory in which instructions or information are stored, and the processor operates based on the instructions or information. The memory may be co-located on the same board or chip with processing elements or else located external to a board or chip containing processing elements. The memory may comprise any combination of read-only memory (ROM), programmable read-only memory (PROM), electrically erasable read-only memory (EEPROM), magnetic or electronic random access memory (RAM), flash memory, disk or tape drive, or other related memory types.

External communication between the robot and an operator, base station, ground station, or cloud server (including but not limited to software updates, firmware updates, or data downloads from the robot) may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information.

Communication, if any, within or between the components of the robot may be through numerous methods or protocols. Serial communication protocols may include but are not limited to SPI, I²C, RS-232, RS-485, CAN, Ethernet, ARINC 429, MODBUS, MIL-STD-1553, or any other suitable method or protocol. Parallel protocols including but not limited to ISA, ATA, SCSI, PCI, IEEE-488, IEEE-1284, and other suitable protocols. Where appropriate, serial and parallel communications may be bridged by a UART, USART, or other appropriate subsystem.

A number of variations are possible on the examples and embodiments described above. The technology described herein may be employed in mining, space exploration, undersea exploration, and the exploration of uninhabitable areas such as volcanoes and the interior of nuclear reactors.

Accordingly, the logical operations making up the embodiments of the technology described herein are referred to variously as operations, steps, objects, elements, components, or modules. Furthermore, it should be understood that these may occur in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the self-lifting robot with automatic release and multi jointed arm.

Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the self-lifting robot with automatic release and multi jointed arm as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A self-lifting robot with multi-jointed arm, the robot comprising:
   a multipart housing;
   a traction drivetrain capable of generating translational and rotational motion of the self-lifting robot on a working surface;
   a deployment hook configured to release from a storage hanger, thus depositing the self-lifting robot onto the working surface, and configured to re-attach to the storage hanger, thus lifting the self-lifting robot off of the working surface;
   a multi-jointed arm; and
   a grabber disposed from a free-rotating wrist joint at a distal end of the multi-jointed arm, and configured to grab, hold, and release one or more target objects,
   wherein the deployment hook is disposed at a distal end of an extendable mast operated by a linear actuator, and wherein the deployment hook is operated by the linear actuator combined with a return spring and a static track that define a particular orientation of the deployment hook for each particular position of the linear actuator.

2. The self-lifting robot of claim 1, wherein the linear actuator comprises a limit switch.

3. The self-lifting robot of claim 1, further comprising internal supports to keep the self-lifting robot from bending while the deployment hook is lifting the self-lifting robot off of the working surface, and wherein the traction drivetrain comprises two tank treads, and wherein each tank tread comprises an upward-angled front section.

4. A self-lifting robot with multi-jointed arm, the robot comprising:
   a multipart housing;
   a traction drivetrain capable of generating translational and rotational motion of the self-lifting robot on a working surface;
   a deployment hook configured to release from a storage hanger, thus depositing the self-lifting robot onto the working surface, and configured to re-attach to the storage hanger, thus lifting the self-lifting robot off of the working surface;
   a multi-jointed arm comprising:
      a shoulder joint attached to the self-lifting robot and operated by a shoulder joint motor and a shoulder gear;
      an upper arm attached to and oriented by the shoulder joint;
      an elbow joint attached to the upper arm and operated by an elbow joint motor, an elbow joint motor shaft, an elbow joint worm gear, and an elbow joint gear; and
      a forearm attached to and operated by the elbow joint, wherein the free-rotating wrist joint is disposed at a distal end of the forearm; and
   a grabber disposed from a free-rotating wrist joint at a distal end of the multi-jointed arm, and configured to grab, hold, and release one or more target objects.

5. The self-lifting robot of claim 4, wherein the grabber comprises:
   two pedipalps, each pedipalp comprising a hub and four paddles;
   a grabber motor;
   a gear train that causes the pedipalps to rotate synchronously in opposite directions in response to a rotation of the grabber motor;
   a holding area configured to hold one or more target objects, such that when the pedipalps rotate in an inward direction, target objects are drawn into the holding area, and such that when the pedipalps rotate in an outward direction, target objects are expelled from the holding area; and
   a hinge limiter or hinge block adjacent to the free-rotating wrist joint, to prevent the grabber from pivoting around the free-rotating wrist joint below a certain angle relative to the forearm.

6. A self-lifting robot with multi jointed arm, the robot comprising:
   a multipart housing;
   a traction drivetrain capable of generating translational and rotational motion of the self-lifting robot on a working surface;
   a deployment hook configured to release from a storage hanger, thus depositing the self-lifting robot onto the working surface, and configured to re-attach to the storage hanger, thus lifting the self-lifting robot off of the working surface;
   a multi-jointed arm comprising:
      a shoulder joint attached to the self-lifting robot and operated by a shoulder joint motor and a shoulder gear;
      an upper arm attached to and oriented by the shoulder joint;
      an elbow joint attached to the upper arm and operated by an elbow joint motor, an elbow joint motor shaft, an elbow joint worm gear, and an elbow joint gear; and
      a forearm attached to and operated by the elbow joint, wherein the free-rotating wrist joint is disposed at a distal end of the forearm;
   a grabber disposed from a free-rotating wrist joint at a distal end of the multi-jointed arm, and configured to grab, hold, and release one or more target objects; and
   a processor, wherein the processor is a smartphone and wherein the smartphone is protected within a phone case attached to the multipart housing.

7. The self-lifting robot of claim 6, wherein the processor keeps track of the self-lifting robot's orientation by integrating an inertial measurement unit gyroscope, and wherein the processor keeps track of the self-lifting robot's position by integrating traction drivetrain rotation encoders.

8. The self-lifting robot of claim 6, further comprising a color-sensitive 3D vision system configured to enable the processor to identify a location and a color for each of the one or more target objects.

9. The self-lifting robot of claim 6, further comprising a marker drop mechanism configured to drop a marker upon receipt of a signal from the processor, and wherein the multipart housing comprises side plates.

10. The self-lifting robot of claim 9, wherein the marker comprises a dreidel shape and a logo.

* * * * *